UNITED STATES PATENT OFFICE.

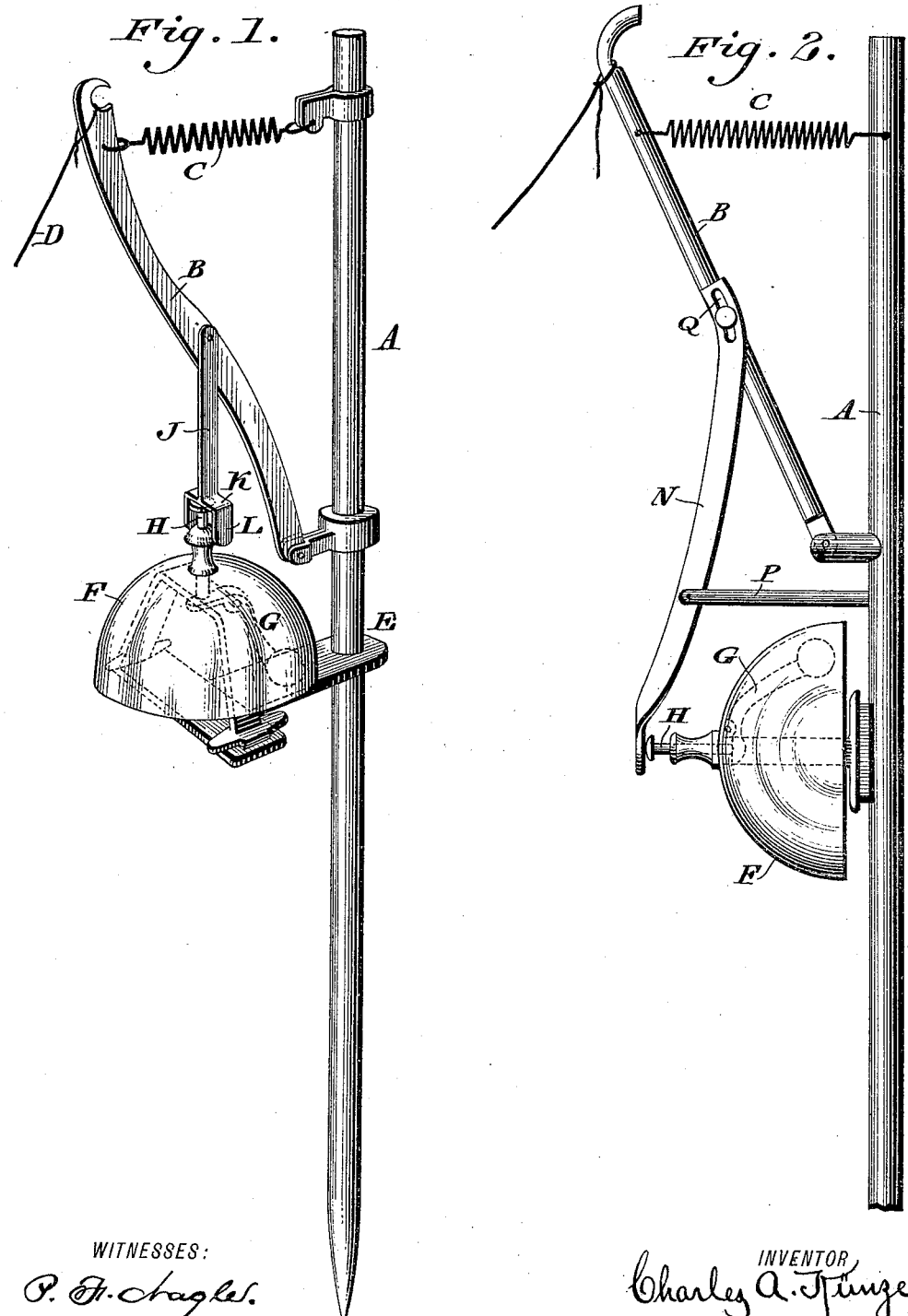

CHARLES A. KÜNZEL, OF CAMDEN, NEW JERSEY, ASSIGNOR OF ONE-HALF TO CHARLES F. ELSER, OF PHILADELPHIA, PENNSYLVANIA.

FISHING DEVICE.

SPECIFICATION forming part of Letters Patent No. 467,121, dated January 12, 1892.

Application filed June 8, 1891. Serial No. 395,499. (No model.)

*To all whom it may concern:*

Be it known that I, CHARLES A. KÜNZEL, a citizen of the United States, residing in the city and county of Camden, State of New Jersey, have invented a new and useful Improvement in Fishing Devices, which improvement is fully set forth in the following specification and accompanying drawings.

My invention relates to improvements in fishing devices; and it consists of a spring-controlled arm, to which the fishing-line is attached, and a pivoted arm operated by the movement of said spring-arm and adapted to actuate the hammer of a bell, substantially as described.

Figure 1 represents a perspective view of a device embodying my invention. Fig. 2 represents a side view of a modification of the device.

Similar letters of reference indicate corresponding parts in the two figures.

Referring to the drawings, A designates a standard adapted to be inserted in the ground or otherwise suitably secured to a proper support. To a collar on the said standard A is pivotally connected an arm B, having a contractile spring C secured to its upper end and to the standard. A fishing-line D is secured to the upper or spring end of the said arm B. On a frame E, connected with the standard, is mounted a bell or gong F, having a pivoted elbow hammer-arm G, adapted to be operated by the sliding rod or plunger H. To operate the said rod H, lever J is employed, the same being pivoted to the arm B and provided with a head K, which is adapted to come in contact with said rod H and depress the same, thereby moving the arm G and ringing the bell. The head K is provided with the flanges L, which embrace the periphery of the head of the said rod H, so as to insure the contact of the said head therewith, and thereby the working of the device.

Having thus described my invention, what I claim as new, and desire to secure by Letters Patent, is—

1. A fishing device having a standard, a spring-controlled arm pivoted thereto, a gong or bell with a hammer, and a lever pivotally connected with the said arm and adapted to operate the said hammer, said parts being combined substantially as described.

2. A standard, a spring-controlled arm pivoted thereto, a gong with hammer and an operating-rod, and an arm pivoted to said spring-controlled arm and provided with flanges embracing the head of said rod, said parts being combined substantially as described.

CHARLES A. KÜNZEL.

Witnesses:
JOHN A. WIEDERSHEIM,
A. P. JENNINGS.